FLUIDIC CIRCUIT AND MANIFOLD CONSTRUCTION

Filed Dec. 19, 1966 5 Sheets-Sheet 1

INVENTORS
Edwin M. Dexter &
Carmine V. DiCamillo

BY [signature]

ATTORNEYS

INVENTORS
Edwin M. Dexter &
Carmine V. DiCamillo
BY Hurvitz, Rose & Greene
ATTORNEYS INVENTORS
Edwin M. Dexter &
Carmine V. DiCamillo BY Hurvitz, Rose & Greene
ATTORNEYS INVENTORS
Edwin M. Dexter &
Carmine V. DiCamillo
Hurvitz, Rose & Greene
ATTORNEYS Aug. 19, 1969 E. M. DEXTER ET AL 3,461,900

FLUIDIC CIRCUIT AND MANIFOLD CONSTRUCTION

Filed Dec. 19, 1966 5 Sheets-Sheet 5

INVENTORS
Edwin M. Dexter &
Carmine V. DiCamillo

Hurvitz, Rose & Greene
ATTORNEYS 3,461,900

FLUIDIC CIRCUIT AND MANIFOLD CONSTRUCTION

Edwin M. Dexter and Carmine V. Di Camillo, Silver Spring, Md., assignors to Bowles Engineering Corporation, Silver Spring, Md., a corporation of Maryland
Filed Dec. 19, 1966, Ser. No. 602,889
Int. Cl. F15c *1/08;* F16k *11/00*
U.S. Cl. 137—81.5 15 Claims

ABSTRACT OF THE DISCLOSURE

A manifold for fluidic circuits comprises two members which, when sealed together in face-to-face relation, provide two large parallel surfaces and a flat cavity enclosed therebetween. Circuit boards may be bonded to one or both surfaces such that the surface serves as a cover plate for the circuit board. Pressurized fluid is supplied to the manifold cavity and is thus available to the circuit by merely drilling through a manifold surface. The surfaces extend beyond at least two ends of the cavity to form respective end regions which are pressure-isolated from the cavity. Holes through the surfaces at the end regions permit external connections to the circuit boards via the end regions. Hollow columns may be provided across the cavity, pressure isolated from the pressure supplied to the cavity, to permit crossover connections between various circuit boards.

The present invention relates to fluidic devices and systems and, more particularly, to techniques of packaging fluidic devices and systems and to the structures, processes and methods employed in practicing the packaging concepts and techniques of the present invention. A further feature of the invention is the utilization of the packaging techniques thereof to produce integrated circuit boards completely compatible with and forming a part of the structures of the invention.

Although fluidic devices of the stream interaction type were invented over seven years ago, their use is only now becoming widespread. A number of problems have plagued the development of these devices and, as little as two years ago, there were serious questions as to the ability to fabricate reproducible fluid amplifiers on a mass production basis.

The ability to seal the devices was a serious problem for quite some time. The devices are unusually sensitive to leakage between various channels particularly where the control nozzles enter the interaction region. In consequence, in order to produce fluidic devices in quantity, reliable sealing techniques and materials had to be developed.

Concurrently with work directed to solving problems of sealing, considerable effort was expended in developing configurations of devices capable of operating under the many different and varying conditions of industry. This work was directed particularly toward developing devices with sufficiently large tolerance to variations in supply pressures, signal pressures, temperature, moisture and dirt content of the air, etc., to be able to take these devices out of the carefully controlled conditions of the laboratory and employ them in and under relatively uncontrolled environments and operating conditions.

Once the problems of sealing and element design had been solved to an extent sufficient to provide a commercial and industrial capability, the problem of packaging came to the forefront. Originally, it was intended to develop a basic grouping or a small number of basic groupings of elements from which could be assembled a majority or at least a large number of practical control circuit configurations. A survey of various circuit configurations, as applied to various conventional control systems, indicated that most control circuits or functional subcircuits thereof could be assembled from six to twelve components and, if this upper limit is further extended, a surprisingly large number of control functions can be produced. Also as a result of this research, it was found that a large number of the control and logic functions encountered could be performed with elements of a size permitting packaging of the numbers of elements contemplated above within a reasonable size package.

Any packaging system, regardless of the approach taken, must minimize cost and maximize ease of circuit selection and ease of handling, i.e. mounting, transporting, storing. When the approach set forth above is employed, i.e. circuits designed for each specific control function, then the packaging technique must provide a very high degree of flexibility in arrangement and choice of elements in the package. Further, any packaging technique must be compatible with present circuit board fabrication techniques to be widely accepted by the industry.

The above requirements are met in accordance with the present invention by employing a supply pressure manifold as the basic structural element of the system. The manifold consists of two identical members which, when placed face-to-face, provide two large parallel surfaces and a large flat enclosed cavity therebetween. Circuit or component boards may be bonded to one or both of the surfaces of the manifold with the manifold surface providing the closure for the channels in the circuit board. Supply pressure is supplied to the manifold's internal cavity and is thus available at substantially any location on the manifold surfaces by merely drilling through the surface into the cavity. Many input and output connections, twenty-eight in the specific embodiment illustrated herein, are provided about the periphery of the board for each circuit plate. The manifold is about 6 x 9 inches and provides an area on each surface capable of accepting at least twelve elements (up to twenty-five elements in many cases) per plate or fifty elements per assembly of a specific size of circuit element found suitable for supplying the mass flows and pressures found necessary to most control applications.

The use of a manifold which is assembled from two identical parts which provides two large surfaces that seal and support the circuit boards and which has a large internal cavity that performs as an accumulator so that at least partially controlled supply pressure is available at practically any location of the device; permits the fulfillment of the requirements of great flexibility of circuit design coupled with low cost and structural simplicity.

Relative to circuit design per se, the packaging technique of the present invention includes many other advantageous features; such as, ease of effecting flow channel crossovers, accurate metering to various different lower supply pressures and ease of effecting connection to external circuits. The former two features are the result of the construction of the manifold. To impart the necessary structural strength to the manifold, generally rectangular islands are located at various places in the supply pressure cavity, the islands forming support columns between the two internal flat surfaces of the cavity. The columns are hollow and crossover of signal channels may be effected by drilling into a hollow column at spaced locations to provide input and output flow paths to the hollow channel in the column. Also, by cutting a properly dimensioned orifice through the wall of the column and then drilling a properly dimensioned hole through the aforesaid surface of the manifold, a reduced and metered supply pressure is made available to the circuit boards.

From the structural point of view, the manifolding technique of present invention minimizes complexity of the manifold and complex multiport molds are not required. Also, the apparatus is such that all connections are made through female fittings so that there are no pieces protruding from the structure. Filtering is provided for all signal channels by the use of internally mounted screens and entrainment of dirt through dump passages is also minimized by appropriate filtering in the cover of the apparatus.

A cover plate for each circuit plate is employed, the cover plate being secured to the manifold and serving to capture hose connections so they cannot be readily dislodged from the manifold. The cover plate also retains filter material over each circuit board to screen the dump passages. The structure may be mounted in a rack or other suitable support by means of mounting brackets secured to the manifold.

Another feature of the packaging technique of the present invention is the ability to adapt conventional methods of fabrication of fluidic devices to the rapid and economic production of circuit boards having integrated fluidic circuits formed therein, which boards may be directly mounted on the manifold in exact register with the various apertures, islands, pressure taps, etc., of the manifold. One such process which is compatible with the packaging techniques of the present invention is the Optiform process of applicants' assignee as disclosed in co-pending application Ser. No. 219,168, filed Aug. 24, 1962, in the names of Metzger and Hinshelwood. As applied to the present invention, the Optiform process contemplates laying down a master outline of the manifold plate showing locations of all input and output holes and locations of islands, etc. A clear plastic sheet is laid over the master and opaque templates of the individual circuit elements are arranged on the sheet. Where the number of elements is small, the arrangement of elements is a simple operation. However, where large numbers of elements are involved, some manuvering of elements is required to insure proper access to supply pressure (avoidance of the islands) and to inlet and outlet apertures and the flexibility afforded by the techniques of the present invention is essential. After the elements are arranged, they are secured to the sheet, for instance, by cellophane tape and then interconnecting channels in the form of opaque plastic strips are laid down. The manifold master displays the location of all inlet and outlet apertures and thus, accurate alignment of all connections between the circuit board and the manifold may be assured.

The circuit now appears on the clear plastic sheet and is photographed to provide a circuit master or "printer." An Optiform circuit plate can now be formed and the plate bonded to the manifold with the channeled surface of the Optiform plate in contact with the apertured surface of the manifold. The circuit plate is, by this process, sealed and all interconnections to various supply pressures and external connections completed.

Prior to bonding of the Optiform plate to the manifold, a copy of the circuit printer is laid over the surface of a manifold plate and all holes required to be drilled in the manifold plate are now drilled. Thus, when the circuit plate is bonded to the manifold, all connections to P+ and the interior of the islands are also made.

It is apparent from the above description of the process of forming the circuit board that complete flexibility of design is provided, circuit configurations being primarily limited only by the area of the manifold surface available to accept circuit elements. It is also apparent that the manifold techniques of the present invention lend themselves readily to breadboarding. Each circuit plate may have several individual and internally unconnected circuit elements, thus providing up to fourteen circuit elements per structure. These elements may be externally interconnected to test various control or logic functions during the course of design of a circuit. Once a design is finalized, a circuit board or boards containing the circuit may be made by the process set forth above.

It is an object of the present invention to provide a packaging technique for fluidic devices that is rugged, economical to produce and provides great flexibility of circuit design.

It is another object of the present invention to provide a packaging technique for fluidic devices permitting an unusually high degree of flexibility in circuit design including design of circuits requiring more than one supply pressure, signal and supply crossover channels, and numerous input and output connections.

It is still another object of the present invention to provide a packaging technique which is completely compatible with present circuit board production techniques.

Yet another object of the present invention is to provide a packaging technique which is equally applicable to the formation of packaged fluidic elements and integrated circuits.

Another object of the present invention is to provide a packaging structure that is compact, economical and compatible with available techniques for fabricating circuit boards.

Still another object of the present invention is to provide a two part manifold constructed to facilitate sealing of one part to the other and to which circuit boards may be easily bonded in sealed relation.

Yet another object of the present invention is to provide a packaging technique for fluidic devices which technique provides complete ease of access to all input and output passages and supply and vent channels, provides a strong structure and one which does not contain protruding elements.

It is another object of the present invention to provide a method of making fluidic elements and circuit boards which method is wholly compatible with the packaging techniques of the present invention and with prior art techniques for fabricating such boards.

Still another object of the present invention is to provide a method of producing pure fluid system in which a majority of the elements are standardized thus permitting low cost quantity production of these elements, and in which the circuit per se is the only special item in the system.

The above and still further objects, features and advantages of the present invention will become apparent upon consideration of the following detailed description of one specific embodiment thereof, especially when taken in conjunction with the accompanying drawings, wherein.

Figure 1:
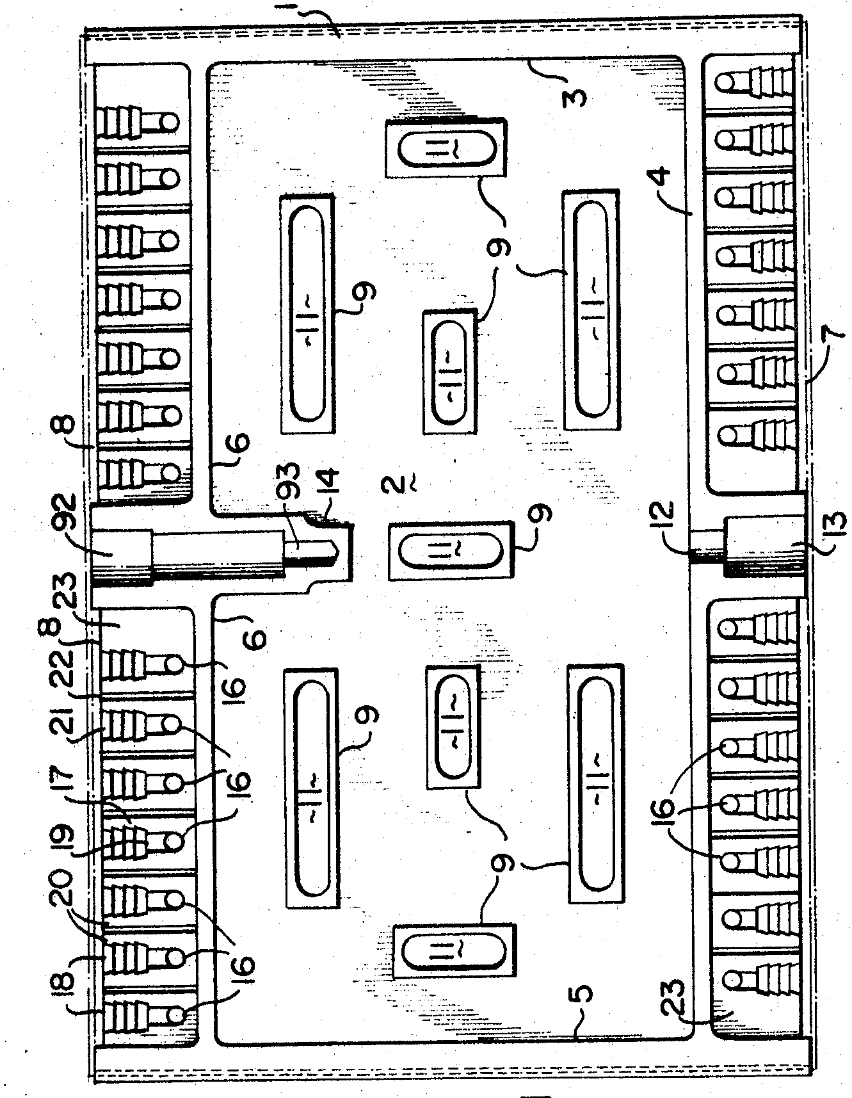
FIGURE 1 is a plan view of the interior of a manifold plate of the present invention.

Referring now specifically to FIGURE 1 of the accompanying drawings, there is illustrated one of two identical plates 1 required to form a basic manifold in accordance with the present invention. The plate 1 is recessed over a major portion of the face illustrated in FIGURE 1 to provide one-half of an accumulator region 2. The region 2 is defined generally by four walls 3, 4, 5 and 6 extending parallel to the four edges of the generally rectangular plate. The walls 3 and 5 are the short walls of the rectangle, are disposed on opposite ends of the plate 1 and lie at and define edges of the plate 1. The walls 4 and 6 are disposed inwardly from adjacent edges of the plate 1, designated generally by reference numerals 7 and 8.

The region 2 is interrupted by a plurality of islands generally designated by the reference numerals 9 which rise to a height, toward the viewer, equal to the height of the walls 3, 4, 5 and 6, defining the region 2. The interior of the islands 9 are recessed, as designated by reference numeral 11, generally to the depth of the region 2, although this is not an essential of the apparatus and, for certain uses, are recessed to a lesser extent.

The wall 4 is apertured, in the region designated by the reference numeral 12 to permit communication between the region 2 and a semi-cylindrical region 13 lying between the wall 4 and the edge surface 7 of the plate 1. Region 13 is adapted to receive a supply pressure fitting and fluid under pressure supplied to the fitting inserted in the region 13 is introduced into the region 2 through the recess or aperture 12. Opposite to the region 13 is a generally rectangular projection 14 into the region 2, which will be described in greater detail later.

When the apparatus is assembled, the walls 3, 4, 5 and 6 of two identical plates 1 are brought into contact with a suitable sealing material, such as a highly volatile glue, between the two members. The members are then pressed together and form a completely sealed region 2 and sealed regions 11. The only communication at this point, with the sealed region 2, is through the now circular aperture 12 which communicates with a pressure fitting which is to be inserted into the circular region 13.

It will be noted that the region 13 and the member 14 divide the regions external to the walls 4 and 6 into four generally equal areas. Each of these four areas is identical and only one of them will be described. Referring specifically to region 17, defined by the walls 5 and 6, the edge 8 and the projection 14, there are provided seven holes, generally designated by the reference numeral 16, which extend perpendicular to the plane of the plate and through the plate. The region 17 is recessed overall to about the depth of the region 2 and is further recessed to provide semi-cylindrical regions 18 extending from the edge 8 to about half the distance to the wall 6. Each of these semi-cylindrical regions 18 terminates in a rectangular region 19 of generally the same depth of region 18 but of lesser width. The rectangular channels thus provided extend into communication with the apertures 16. The semi-circular channels 18 are ridged, as at 21, so as to provide one-half of a female, Christmas-tree fitting.

The region 17 is provided with a further plurality of narrow rectangular channels 22, subsisting between the walls 20, for purposes to be described. It should be noted that each of the regions corresponding to the region 17 is provided with a shelf 23 which is not recessed. In the upper left region 17, the shelf 23 lies adjacent the member 14. In the upper right region 17, the shelf 23 lies adjacent the wall 3, and in the lower regions lies adjacent the wall 5 on the left and adjacent the region 13 on the right. Each of the regions 17 is provided with seven holes, and since there are four regions 17, the device is provided with twenty-eight holes and corresponding regions 18, 19, etc. These portions of the device constitute the means for making external connections to the manifold and will be described in greater detail subsequently.

As indicated immediately above, the four regions 17 provided along the peripheries 7 and 8 of the plate 1 are recessed across their entire area to the depth of the region 2 and are further recessed to provide the regions 18, 19 and 22. Thus, when the two plates 1 are placed in contact and sealed to provide the basic manifold arrangement, a relatively large gap is left between aligned regions 17 in the two plates. The gap between the surfaces of these two regions is illustrated as equal to the total depth now of the combined regions 2 or the accumulator region of the main manifold. It should be noted, however, that there is no requirement for such dimensioning, the depth of the two regions being independent of one another. It is apparent that connections cannot be made to the semi-cylindrical regions 18 and in order to complete the semi-circular passages 18, to provide hollow cylindrical regions for receiving tubes or other conduits, there is provided an insert member which is common to all of the regions 17; that is, may be employed with any one of the regions 17 of the apparatus. This insert is illustrated in FIGURE 2 and is generally designated by the reference numeral 24.

Figure 2:
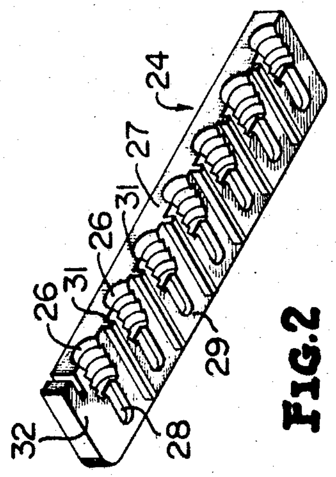
FIGURE 2 is a perspective view of an insert employed with the plate of FIGURE 1.

The insert 24, and reference is made to FIGURE 2 of the accompanying drawings, is of a size generally to fill the regions 17 of each plate, as to width and depth. The insert 24 comprises a plurality of semi-circular recesses 26 which originate adjacent a forward edge 27 that is to be aligned with one of the edges 7 or 8 of the plate 1. The semi-circular recesses 26 terminate in rectangular channels 28 which align with the rectangular regions 19 formed in the plate. The rectangular channels terminate in a semi-circular wall 29 so as to form a continuation of the back wall of the circular aperture 16 in the plate 1. Disposed between each of the semi-circular regions 26 is a rib 31 extending perpendicular to the face 27 of the insert 24. These ribs, after assembly with the plate 1, are seated in the rectangular recesses 22 to provide an additional sealing surface between the insert and the plate and also to increase the length of any leakage path between the various inlet passages formed by the semi-circular recesses 18 and 26, thus reducing the possibility of cross-talk between input and/or output signals. If a circuit board which is to be described subsequently is applied to both upper and lower surfaces of the manifold then insert 24 is applied to all four locations of both of the two plates 1 forming the manifold. If a circuit plate is applied to only one of the surfaces, then four inserts 24 are employed, these all being applied to the single plate to which the circuit board is attached.

Figure 3:
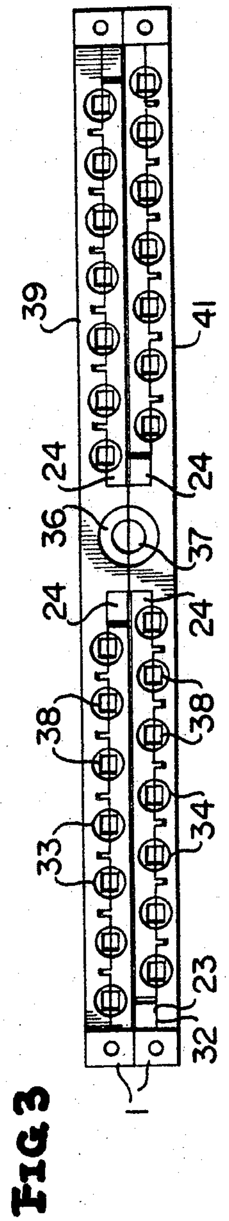
FIGURE 3 is a front view in elevation of an assembled manifold.

The shelf 23 of the board 1 finds a corresponding shelf 32 on the insert 24. The reason for the use of the shelves 23 and 32 is to provide an offset between the connections between upper and lower plates of the manifold. This is clearly seen in FIGURE 3 which is an edge view of a long side of the assembled manifold. In FIGURE 3, inserts have been applied to both the upper and lower plates 1 so that a complete upper and lower set of input-output regions or female Christmas tree fittings 33 are provided. It will be noted that these regions are laterally offset or staggered so that ready access is provided to both regions without undue interference from the tubes inserted in the regions. The ability to stagger the arrangement of Christmas tree female fitting results from the use of the shelves 23 and 32 which, when insert 24 is applied to the lower plate, shifts the apertured portion of the insert to the right and which, when rotated 180° about its transverse center and applied to the upper plate, shifts the insert to the left, thus providing the desired stagger arrangement even though the manifold halves are identical.

The upper and lower plates also provide a hollow cylindrical region 36 for receiving a main fluid pressure fitting, the hollow cylindrical region 36 terminating in a smaller diameter hollow cylindrical region 37 which communicates with the interior of the manifold. The diameter of the region 37 is about the same as the internal diameter of the fitting to be inserted into region 36. Each of the regions 33 and 34 terminates in a rectangular region 38 communicating with the apertures 16. When a complete manifold has been assembled as illustrated in FIGURE 3, circuit plates may be applied to either one or both of the upper and lower major surfaces generally designated by the reference numerals 39 and 41, respectively. The circuit plate may be applied directly to a surface 39 or 41 so that the circuit plate is sealed by bonding to an upper or lower surface of the manifold or a separate, thin, sealing gasket may be applied to the circuit plate and the composite structure applied to one of the surfaces 39 or 41 of the manifold. In the apparatus illustrated in FIGURE 5 of the accompanying drawings, the circuit plate is applied directly to the manifold but there is no intent to limit the invention to this specific construction.

Figure 4:
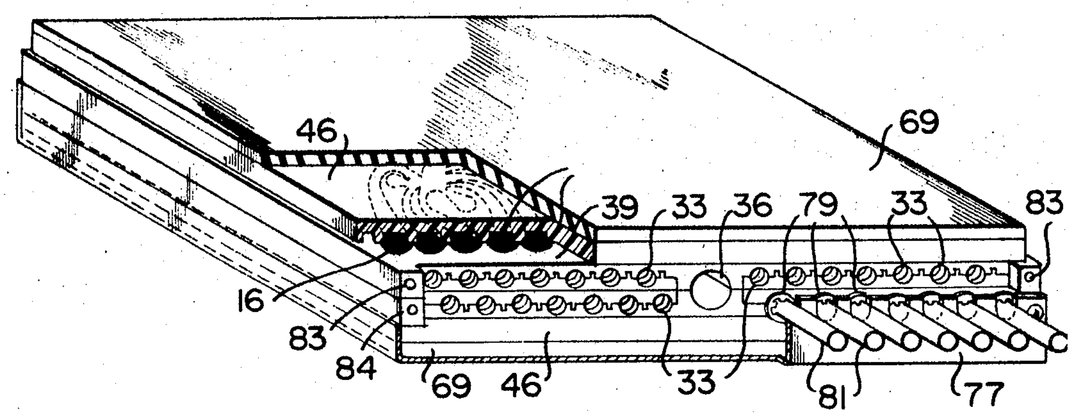
FIGURE 4 is a perspective view of an assembled manifold with a circuit plate assembly sealed to at least one surface thereof, the component being partially broken away to illustrate aspects of the alignment of interior regions of the various elements.

Referring now specifically to FIGURE 4 of the accompanying drawings, there is illustrated a perspective view of a completely assembled manifold, circuit board and cover plate with portions of the circuit board and cover plate broken away to provide a clear view of the construction of the apparatus. Each of the holes 16 through the circuit board is surrounded at the surface 39 or 41, as the case may be, by a recessed region 42 (see particularly FIGURE 5) of sufficient depth to receive a wire screen 43 employed to catch any large particles of dirt which may attempt to enter the system from the manifold. These screens 43 are retained in place by solid portions 44 of a circuit board 46 which portions 44 usually define therebetween fluid flow passages 47 forming a part of the circuit of the circuit board.

Figure 6:
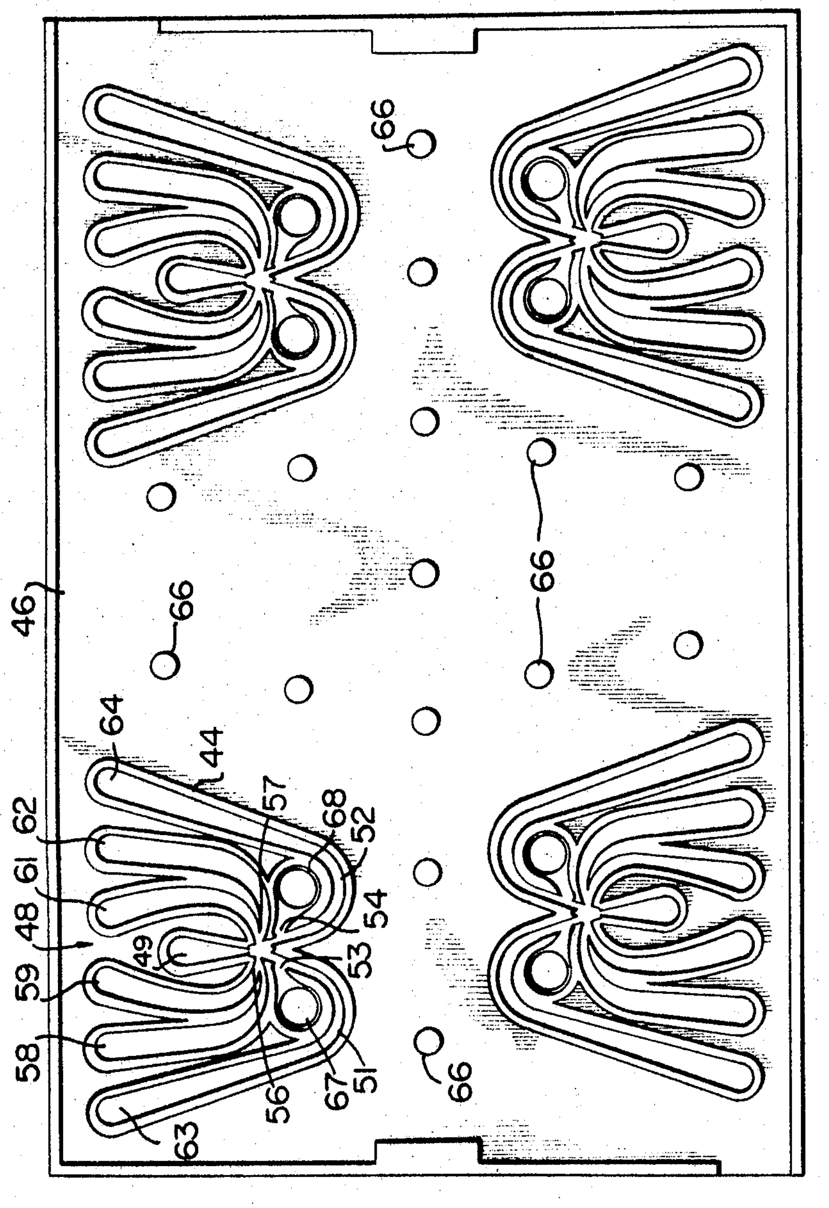
FIGURE 6 is a plan view of the circuit plate of FIGURE 4.

Referring specifically to FIGURE 6 of the accompanying drawings, there is illustrated a circuit board constituting one circuit board which may be employed with the manifold of the present invention. The particular circuit board illustrated has arranged thereon four fluidic flip-flops generally designated by the reference numeral 48 each having a power nozzle 49, two output channels 51 and 52, a pair of vent passages 53 and 54, and two input or control nozzles 56 and 57. The control nozzles 56 and 57 are each adapted to have signals applied thereto from two channels 58 and 59 to one nozzle and 61 and 62 to the other nozzle, each of the two pairs of channels converging at the entrance to their respective control nozzles. The output channels 51 and 52 are connected to passages 63 and 64, respectively, thus completing the construction of the device. The passages 58, 59, 61, 62, 63 and 64 all extend toward the adjacent long side of the plate so as to communicate with a different aperture 16 formed in the plate 1. The passages and all channels of the fluid amplifier are bounded in this embodiment by relatively thin walls which are upstanding from the main surface of the plate 46 so as to engage the sur- 39 or 41 of the manifold. This construction is often employed in order to concentrate the pressure, applied between the plate and the manifold during the sealing operation, on those regions in which sealing is essential.

The raised walls defining the elements are the same walls 44 illustrated in FIGURE 4 as overlying the screens 42. In order to prevent buckling of the plate during this procedure, the plate is provided with a number of upstanding protrusions or islands 66 disposed at various locations on the surface of the plate being viewed in FIGURE 6, i.e. the surface that is to be directed toward the manifold.

Vent passages 53 and 54 are vented externally by means of circular apertures 67 and 68, respectively, which are drilled through the rear surface of the plate; that is, the surface directed away from the manifold and thus vent into the atmosphere above the plate and externally of the device. It will be noted that, in the particular arrangement illustrated providing four flip-flop elements on a single plate, any desired interconnection of these four elements on this single plate, or of the total of eight elements on the total manifold structure if two plates are employed, may be achieved. The devices may be operated in series or parallel or serio-parallel or as completely independent and separate units, thus providing complete flexibility of arrangement.

To complete the elements forming the structure of the present invention, a thin layer of, for instance, sponge or cellular material such as rubber or one of the well-known plastics, overlies the upper surface of the plate 46, as illustrated in FIGURES 4 and 6*a*. This sponge or foam layer, which is designated by the reference numeral 69, is employed to permit access of the vent holes 67 and 68 on the various circuit elements with the atmosphere while preventing ingress of dirt. The layer of material 69 is maintained in place by a cover plate 71 which presently constitutes aluminum but may be formed from any other conventional or non-conventional metallic or non-metallic material. The cover plate which is illustrated more fully in FIGURE 7 has a series of four dimpled regions 72, the number being relatively unimportant so long as at least three of these regions are provided. These regions permit the manifold to be laid down without blocking holes 73 which permit communication of the various external vent passages of the circuit plate with the ambient atmosphere via the layer of foam material 71 and the apertures.

Figure 7:
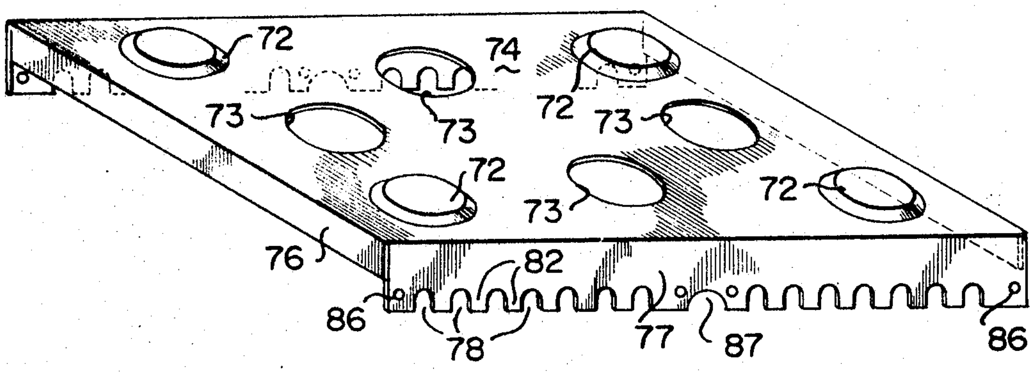
FIGURE 7 is a perspective view of a cover plate employed with the apparatus of FIGURE 4, the cover plate being in alignment with the apparatus of FIGURE 4.

The dimples 72 and apertures 73 are formed in a main surface of the plate, the plate being provided with four downwardly extending edges or walls 76 and 77, respectively. The parallel, opposed walls 76 are relatively short walls and terminate at the upper edge of the plate 1 when the cover is applied to the manifold. The walls 77, however, are sufficiently long to extend into contact with one another when the cover plates 74 are applied to both the upper and lower parts of the manifold structure. The lower edge, as illustrated in FIGURE 7, of the upper walls 77 are provided with a plurality of slots 78 equal in number to and aligned with the female Christmas tree fittings 33. This arrangement of the slot 78 is employed to positively retain external connections to the device in normal usage. Specifically, a metallic internally-fingered washer 79 may be applied to and adjacent the end of each tube 81 which is to be inserted into one of the female Christmas tree fittings 33. The tube 81 is then inserted into one of the fittings 33 or, more particularly, all of the tubes that are to be connected into the various fittings 33 are inserted with a washer 79 applied. The metallic cover 74 is then secured in place in a manner to be described subsequently. In the process of applying the cover plate 74, the recesses 78 are applied over the tubes 81 so that metal portions 82 lying between the recesses 78 block withdrawal of the washers 79 which are now positioned between the wall 77 and an edge of the plate 1. Thus, a tube 81 can be pulled out of its aperture only if it is pulled out of the washer 79. Due to the use of the internal fingers, a considerable amount of pull or force is necessary to effect such a disconnection.

The plates 1 are provided with projections 83 which extend outwardly from the walls 78 at the edges of the plates. Each of these projections is provided with a threaded aperture 84 adapted to receive a machine or other type of screw after it passes through a corresponding aperture 86 in the wall 77 of the cover plate 74. A corresponding projection, though not illustrated may be provided around the central input or pressure input aperture 36 so as to positively retain this appliance or fitting within the structure, it being noted that a recess 87 is employed to surround such fitting.

Returning now for a moment to FIGURE 6, it is apparent that in order to apply pressure to the power nozzle 49 of the flip-flop 48, the manifold must be drilled to provide a connection between the internal region 2 and the power nozzle. If the pressure to be applied to the power nozzle 49 is the same as the pressure throughout the region 2 then the tap can be made anywhere within the boundaries of the walls 3, 4, 5 and 6 except in the region of the islands 9. If a special pressure is desired either to be applied to a power nozzle or as a bias control to one of the control nozzles, then depending upon the accuracy required of this pressure either one of the islands 9 may be employed or the region 14 may be utilized. This use of this latter region and its associated appliance will be described subsequently.

Returning now for the moment to the island 9, the islands are provided with internal recesses 11 which, when the two halves of the manifold are assembled, provide a region completely sealed from the remainder of the region 2. If it is desired to obtain a particular pressure for application to a particular nozzle, be it power or control nozzle, then a slot such as the slot 88 of FIGURE 8 may be cut through one or both mating surfaces of the islands 9 to pressurize the interior 11 of the island 9. An aperture may now be drilled through the surface of the plate into the interior 11, the aperture being designated by the reference numeral 89 of FIGURE 7. Communication is now established with some fluidic element nozzle positioned over this particular location. In operation, a continuous flow is established from the region 2 through the passage 88 into the interior 11 of island 9 and through the aperture 89 to the particular nozzle. The slot 88 acts as a pressure dropping restrictor so that a predetermined pressure may be obtained at the nozzle. Thus, numerous different sources of pressure are available from each of the islands 9.

Figures 5, 8:
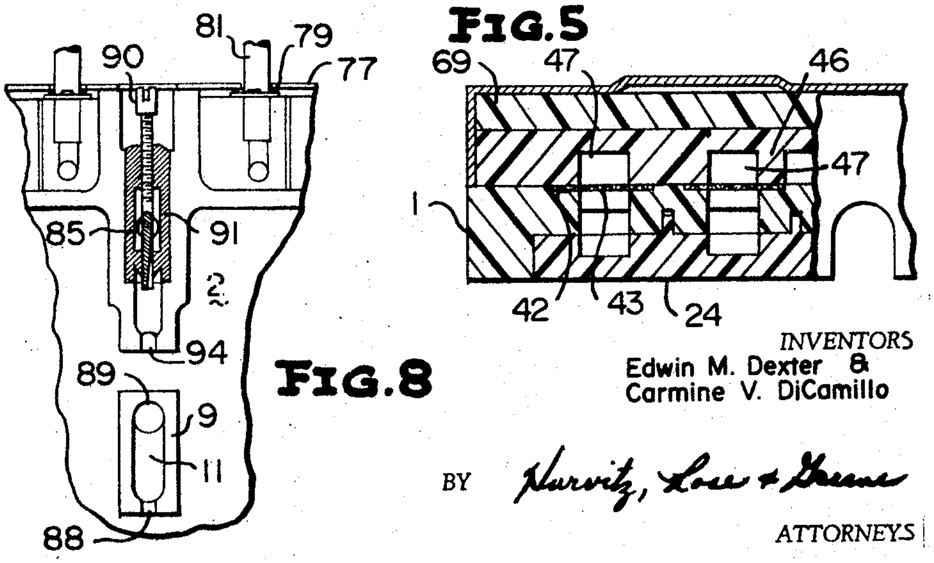
FIGURE 5 is an enlarged view in section of a portion.
FIGURE 8 is a detailed plan view of a V-groove valve assembled with the manifold of the present invention.

If it is desired to obtain a very precise pressure or an adjustable pressure for application to an element or to several elements through branching channels of the circuit plate then a valve 91 may be inserted or applied to a region provided internally of the projection 14. Specifically, each projection 14 provides a semi-circular region 91 terminating in a smaller semi-circular region 92 inwardly of the wall 6. A valve, designated by the reference numeral 91, is inserted into the hollow cylindrical region formed by mating recesses 92. The particular valve illustrated in FIGURE 8 is a V-groove valve as defined in co-pending patent application Ser. No. 500,029 of Sowers et al., filed Oct. 21, 1965 and assigned to the same assignee as the present invention. A port 94 is drilled through the projection 14 so as to provide communication between the region 2 and the semi-circular region 93. Precisely metered fluid may pass then from the region 2 through the port 94 and through the valve to an aperture 85 extending between a surface of one of the plates 1 of the manifold into the communication with an appropriately located aperture in the valve 91. Movement of a threaded member 90 increases or decreases, as the case may be, the size of the aperture through which fluid may flow and thus increases or decreases the pressure available at the aperture 85. As indicated, an element may be positioned over this aperture or hole 85 or a passage may convey the pressure developed therein to one or more components arranged at various locations in the circuit plate.

The islands 9 are not necessarily restricted to use for purposes of providing a particular pressure at a particular location at the surface of the manifold but may be employed as a cross-over by appropriately drilling two holes into a single island and locating channels over the two holes. The longitudinally extending or larger elements 9 are patricularly useful in this respect. The extreme versatility of the apparatus of the present invention becomes readily apparent upon employing a specific example of the method of fabricating a circuit board for use with the particular apparatus or manifold specified herein.

Figure 9:
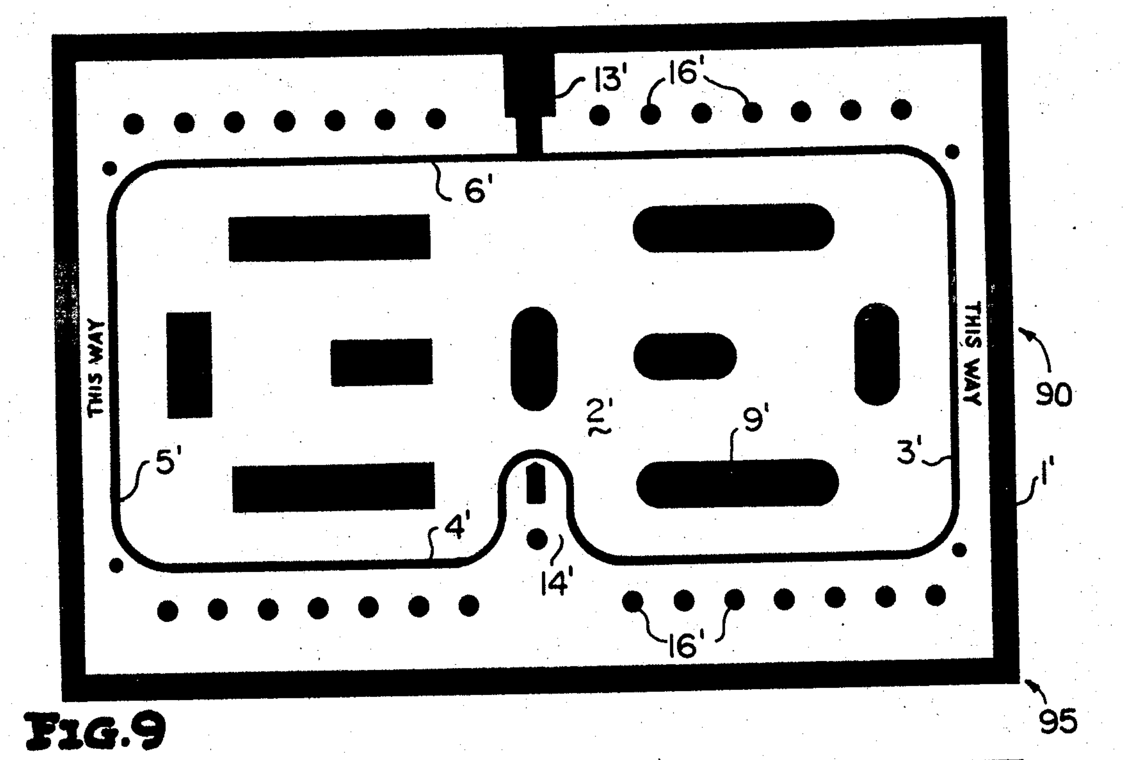
FIGURE 9 illustrates a layout pattern employed in making circuit plates for use with the manifold of the invention.

Referring initially to FIGURE 9, there is illustrated a mask generally designated by the reference numeral 90. Portions of the mask or pattern designating elements of the corresponding manifold bear the same reference numerals as the elements of the manifold but are printed. The mask 95 provides an outline of the interior region 2 and outer periphery (wall) of the manifold plate 1 and also an indication of the location of each of the islands 9, apertures 16 and elements 13 and 14. The mask 95 thus establishes the location of every element of the manifold necessary to location of various fluid amplifier elements and connections to the region 2, the external tubing through apertures 16 and to the interiors 11 of various islands 9. In order to lay out a circuit, a designer need merely locate, relative to the mask 95 the various circuit elements to be employed in a particular system. The particular example which is employed for purposes of the present explanation includes three distinct subcircuits of an overall system only a portion of which is formed on the plate being illustrated. A first subcircuit, generally designated by the reference numeral 96, comprises three monostable flip-flops or OR/NOR devices 97. A second subcircuit, generally designated by the reference numeral 98, includes four additional monostable flip-flops 97. A third subcircuit 99 constitutes a counter having three counter stages 101.

In the particular example under consideration, the circuit is to be formed in a photopolymerizable material provided by the E. I. du Pont de Nemours Company under the trademark Templex. The technique for forming a fluidic circuit in Templex is to expose the photopolymerizable plastic with ultraviolet light through a negative in which the areas designating channels to be formed in the final plate are opaque on the negative to the light of the source being employed. The negative is completely transparent except for these opaque regions and thus, light strikes all regions of the photopolymerizable material except where channels are to be formed in the final product. The exposed plate is then washed in a chemically basic or alkaline solution and all of the material which has not been exposed to light is removed by the solution whereas the material which has been exposed to light has been polymerized and is substantially unaffected by the alkaline solution. After the washing, the plate has a plurality of channels formed therein which, when a sealing plate is applied to the channeled surface of the plate, provides the necessary fluidic elements as defined by the configuration of black regions on the original printing negative.

As a result of this method of forming fluidic circuits, it is customary to have on hand a number of opaque master silhouettes for each different type of element normally used by the design of these circuits. These silhouettes constitute master printers for the particular types of elements and are kept on file. Thus ,whenever a need arises for a particular type of element, opaque-on-transparent prints are made from the master to the particular size of the element to be employed in a specific circuit; a number of prints of one or several sizes being made in accordance with the number of elements of each size required in the circuit under design.

In the circuit under description, there are required seven monostable flip-flops and three binary stages. Opaque-on-transparent prints of the aforesaid elements are made from the available masters in the size required for the particular circuit being designed. The prints are then secured to a transparent celluloid or other suitable base 100 (see FIGURE 11) which is laid over the mask 95.

Figure 10:
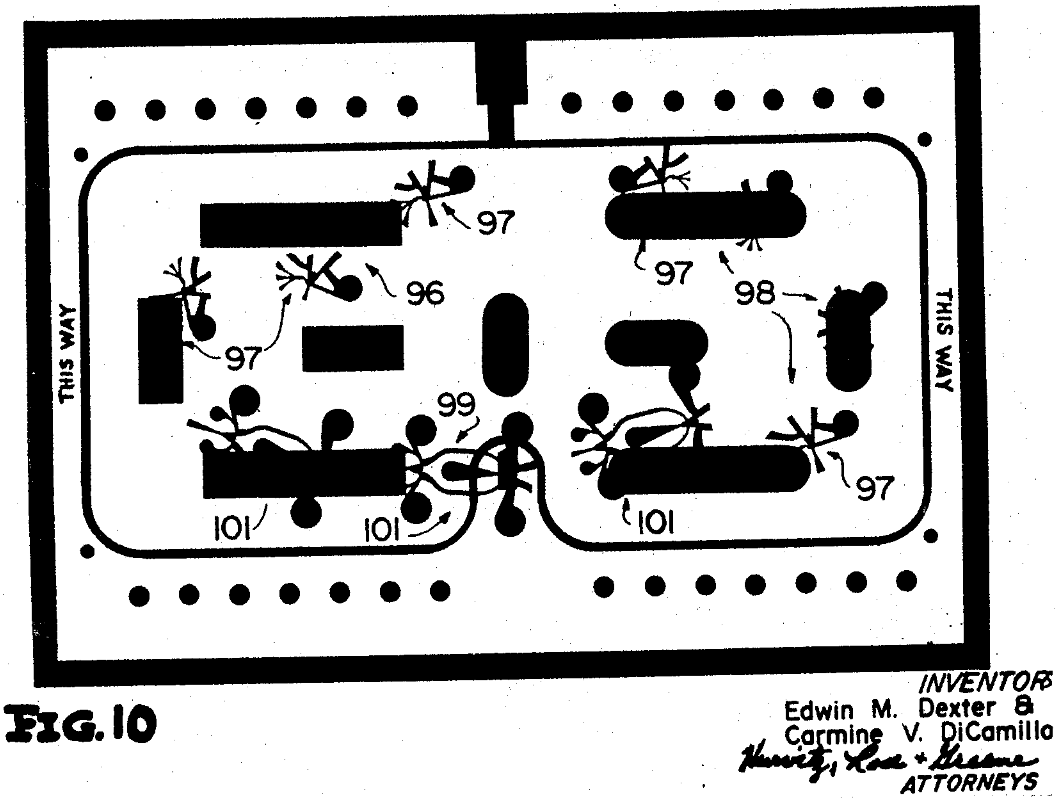
FIGURE 10 illustrates a first step in making circuit plates and shows a layout pattern with circuit element negatives located relative thereto.
Figure 11:
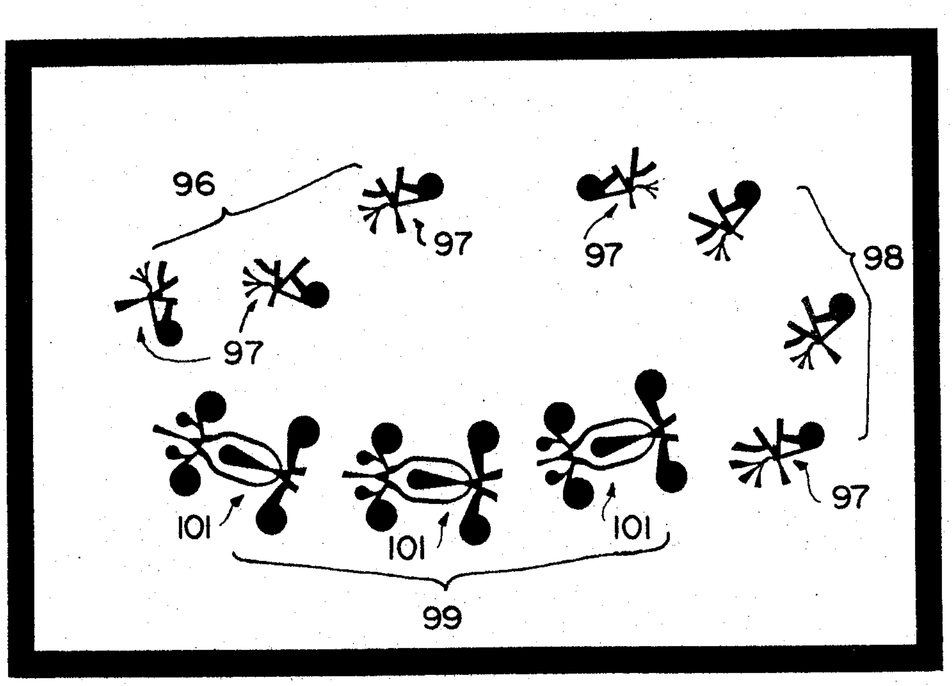
FIGURE 11 is a view of the element layout effected by the step illustrated in FIGURE 10.

The particular arrangement of elements on the base is dependent upon the circuit to be developed and the various arrangements which are desired by the designer. The layout of the particular elements for the subcircuits being considered for the particular example under discussion, is illustrated in FIGURE 10 which illustrates the relationship of these elements to the mask 95 viewed through the transparent negative 100. The transparency 10, when removed from the pattern or mask 95, is illustrated in FIGURE 11.

Figure 12:
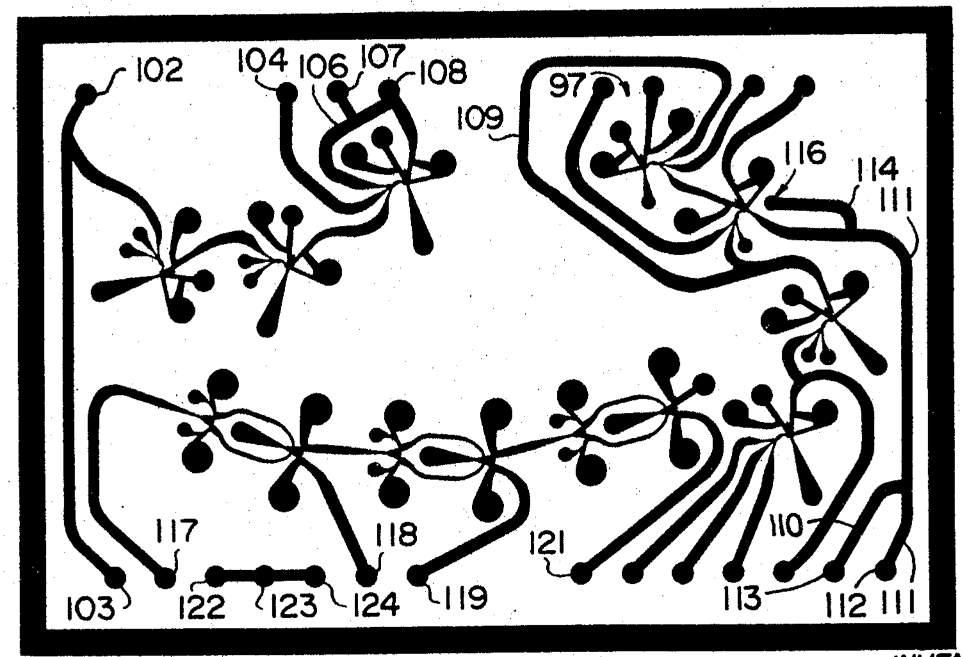
FIGURE 12 is a view of the final layout negative or circuit plate provided by the method of the invention.

Interconnections of the various elements may be now undertaken in accordance with the basic circuit layout desired. The interconnections are effected by employing an opaque cellulosic type material cut to conform to the particular channel configurations desired. The final product of this arrangement is illustrated in FIGURE 12. It will be noted that the grouping 96 of the elements 97 provides for serial cascading, i.e. the output of the first or left-most element in the group 96 is fed to a control nozzle of a second member and the right output passage of the second monostable flip-flop 97 is fed to a left control passage of a further or third monostable flip-flop. The vent channels will eventually all be vented by drilling through the backing of the photopolymerizable plastic.

The extreme flexibility of the specific design becomes readily apparent by an analysis of the three specific subcircuits illustrated in FIGURE 12. An input connection is provided at a passage 16 designated by the reference numeral 102 and this is connected to the lefthandmost monostable flip-flop 97. This input lead is also connected to another aperture 16 which is designated by the reference numeral 103 and thus is available at an output passage of the manifold for connection to a further part of the overall circuit, if desired. It will be noted that the left control nozzle of the third flip-flop 97 in the subassembly 96 is provided with a second input signal from an input channel 104 and is provided with a third input signal from a feedback channel 106. The output signal is available from the third flip-flop from two output apertures 16 designated by reference numerals 107 and 108, respectively, and thus a fan-out of two is available directly from the module.

The subassembly 98 provides additional examples of the extreme flexibility of the apparatus. It will be noted that cross-over has been effected via a channel 109 by carrying the channel outside of the apertures 16. Thus, the outer limit on the circuits in the circuit plate is the outer limit of the surfaces 39 and 41 of the apparatus since the circuits in the plate, to the extent that they do not require communication with specific regions of the manifold per se, are not limited by the extent of the region 2 or the location of the apertures 16 or any other restraints. There is also illustrated an example of the ability to supply a particular element with a pressure distinct from that available from the interior of the manifold 2 and to employ the islands 9 for cross-over. Specifically, a channel 111 is connected between an aperture 112 and the monostable flip-flop 97 which is just below the upper element of this particular group as viewed in FIGURE 12. It will be noted that channel 111 is provided with branch channels 110 and 114. The channel 110 is connected to an aperture 16 designated by numeral 113 so as to permit coupling of this pressure to other circuit boards. The channel 114 terminates in a circular region designated by the reference numeral 116. The region 116 indicates the location of an aperture extending through the surface of the manifold into a region 11 internally of one of the islands 9. Communication is established through the interior of the island 9 to the power nozzles of the left upper element 97 of the circuit 98. The islands 9 may also provide for signal communication between the two sides of the manifold. Thus, a portion of one circuit board may be borrowed for use with the circuit board on the other side of the manifold.

The subsystem 99 is conventional in every detail in that input pulses for counting by the chain are applied to an input aperture 117 and individual output pulses from elements of the counter chain are provided at output passages 118, 119 and 121. Additional branching is provided for portions of the circuit not forming a part of the illustrated circuit board by borrowing the apertures 16 designated by reference numerals 122, 123 and 124 for use with another circuit board of the system.

It should be noted that the circuits illustrated by FIGURE 12 are part of an overall control circuit for apparatus employed in assembling the manifolds and circuit plates of the present invention.

After the complete negative printer is formed as illustrated in FIGURE 12, a plate of photopolymerizable plastic is exposed through the negative printer and the circuit plate formed. An extra printer may be employed to act as a template for drilling holes other than the holes 16 in the plates 1. Specifically, apertures must be drilled for each power nozzle and, as indicated in FIGURE 8 for instance by the aperture 85 and as required in the present example by the aperture terminating the additional branch channel 116. The circuit plate may then be bonded against one of the surfaces 39 or 41 of a manifold in appropriate registry with the apertures 16 and other apertures in the plate 1 or may first be sealed by a thin appropriately apertured plate and then bonded to the manifold.

In summary, the method of fabricating fluidic elements or circuits in accordance with the present invention is to initially form the plates 1 and the inserts 24. The plates are drilled to provide access to regions 2, 11, etc. where required, and slots cut in islands 9 and projection 14, also as required. Inserts 24 are assembled to and bonded with the plates 1. The two plates 1 forming the two halves of the manifold are then sealed together to provide the manifold structure. A printed circuit element or circuit system plate is prepared as described immediately above and thereafter is sealed with an appropriately apertured separate sealing plate or is sealed against one of the surfaces 39 or 41 of the manifold. Prior to sealing, the screens 43 should be inserted. If the circuit plate is sealed with a separate mask, then the screens 43 are placed in the depressions 42 prior to sealing of the apertured mask against the manifold surface. The device is now completely assembled and, if required, the valve 96 may be inserted. Tubes 81 are now inserted into the appropriate apertures 33 and cover plates applied with the foam material having previously been sealed interiorly of the cover plates. Mounting brackets may be secured to the manifold such as by the same screws that hold the cover plate. Any mechanical bracket may be employed, the form of such members being determined by the form of the structure to which the assembly is to be connected.

It is seen from the above that the two manifold halves, the insert, the foam rubber pads and the covers, are all of standard design and can readily be mass produced relatively inexpensively. Also regardless of the final configuration of the circuit in the circuit plate, the assembly techniques are standard and thus, this operation may be performed with semiautomatic or automatic techniques permitting additional cost savings. The only steps in the overall construction of the circuit assembly that require individual attention are the layout of the circuit, and the fabrication of the plastic plate. Of course, if the plastic plate is to be employed in forming a mold for subsequent molding of circuit boards, additional individual functions must be performed.

As to drilling of the manifolds for connections to P+ or the islands 9, etc., even these steps can be performed by a tape or card programmed machine if the production run is large enough to warrant the initial machine set-up time. Thus, the present invention provides an apparatus and a method of producing same which provides complete flexibility in selection of circuit elements to be provided in a module, either a number of individual elements or a complex integrated circuit, and in spite of such flexibility, by far the majority of the elements may be mass produced and assembled.

While we have described and illustrated one specific embodiment of our invention, it will be clear that variations of the details of construction which are specifically illustrated and described may be resorted to without departing from the true spirit and scope of the invention as defined in the appended claims.

We claim:

1. A manifold for fluidic devices comprising a pair of flat body members each having a large generally flat surface, a recessed surface parallel to said flat surface and four relatively narrow edges between said surfaces, each recessed surface having two pairs of mutually perpendicular walls extending upwardly from said recessed surface, two parallel walls of said two pairs of walls being disposed inwardly of their adjacent edges to define a pair of edge regions, fluid conducting means located in said edge regions for making fluid connections between said flat surface of said body member and a source of fluid flow, means for sealing said body members to one another along said two pairs of parallel walls in fluid-tight relation to provide fluid pressure isolation between said end regions and the interior region defined by said walls and said recessed surfaces, and source means for pressurizing said interior region.

2. The combination according to claim 1 wherein each of said body members further comprises a plurality of islands of material rising from said recessed surface a distance above said surface the same as said walls, said islands being hollow to define narrow peripheral edges, the islands in one of said body members being aligned with the islands in the other of said body members when said walls of the two body members are aligned, said peripheral edges of said islands being sealed to one another, and means in at least one of said flat surfaces for communicating with the interior of said islands.

3. The combination according to claim 2 wherein the walls of at least one of said islands is apertured to provide communication with said interior region.

4. The combination according to claim 1 wherein said fluid conducting means comprises a plurality of apertures extending perpendicular to said surfaces through said body member into said edge regions, at least partially formed hose receiving means formed in said recessed surface generally parallel thereto and generally perpendicular to said adjacent edges and flow conveying means extending between each of said hose receiving means and a different one of said apertures.

5. The combination according to claim 4 wherein there is provided an annular region surrounding each of said apertures in said flat surface, said annular regions being depressed below said flat surface, and a flow filter located in each of said annular regions.

6. The combination according to claim 4 further comprising a pair of further walls each extending perpendicular to said two parallel walls, said further walls each being located in a different one of said edge regions equidistant between the edges of said body members and parallel thereto whereby said edge regions are divided into four equal subregions, an insert having formed therein partially formed hose receiving means, and aligning means on said insert and in said edge regions for aligning the partially formed hose receiving means of said edge regions and said insert to define fully formed hose receiving means, each of said subregions being adapted to receive identical inserts.

7. The combination according to claim 6 wherein said aligning means are such that said hose receiving means are staggered as between aligned adjacent subregions in the two body members forming a manifold.

8. A fluidic circuit structure comprising the manifold of claim 1 and further comprising a flat plate having recesses formed in one surface thereof defining fluidic devices, said fluidic devices having power nozzles, control channels and output channels, said flat plate being secured to one of said flat surfaces of said manifold and holes extending through said flat surface into the interior region of said manifold in alignment with at least one of said power nozzles.

9. The combination according to claim 8 wherein said fluid conducting means comprises a plurality of apertures extending perpendicular to said surfaces through said body member into said edge regions, at least partially formed hose receiving means formed in said recessed surface generally parallel thereto and generally perpendicular to said adjacent edges and flow conveying means extending between each of said hose receiving means and a different one of said apertures.

10. The combination according to claim 9 wherein channels connect at least some of said control and output passages each to various of said plurality of apertures.

11. The combination according to claim 10 further comprising a pair of further walls each extending perpendicular to said two parallel walls, said further walls each being located in a different one of said edge regions equidistant between the edges of said body members and parallel thereto, whereby said edge regions are divided into four equal sub-regions, an insert having formed therein partially formed hose receiving means, and aligning means on said insert and in said edge regions for aligning the partially formed hose receiving means of said edge regions and said insert to define fully formed hose receiving means, each of said subregions being adapted to receive identical insert.

12. The combination according to claim 11 further comprising at least one cover plate having a large flat body part overlying said flat plate, and peripheral walls generally perpendicular to said body part, means securing said cover plate to said manifold with at least one of its peripheral walls parallel to and spaced from said edge of said manifold having hose receiving means formed therein, said last-mentioned peripheral wall extending to about half the depth of said manifold and having its edge recessed in alignment with said hose receiving means a distance about equal to the diameter of said hose receiving means.

13. The combination according to claim 10 comprising further channels formed in said flat plate, some of said further channels traversing the region between said apertures and their adjacent edges, and at least some of said further channels interconnecting control and output passages.

14. The combination according to claim 8 wherein some of said fluidic devices have vent channels formed therein, said vent passages extending through the surface of said flat plate remote from said manifold, and a foamed material covering said vent passages.

15. The combination according to claim 14 further comprising an apertured cover plate overlying said foamed material.

References Cited

UNITED STATES PATENTS

| | | | |
|---|---|---|---|
| 2,916,128 | 12/1959 | Oxley et al. | 137—608 XR |
| 3,057,551 | 10/1962 | Etter | 137—81.5 XR |

(Other references on following page)

| | | | |
|---|---|---|---|
| 3,135,290 | 6/1964 | Carls | 137—608 |
| 3,176,714 | 4/1965 | Smith et al. | 137—608 XR |
| 3,248,052 | 4/1966 | Schonfeld et al. | |
| 3,302,004 | 1/1967 | Eckert et al. | 235—201 XR |
| 3,323,545 | 6/1967 | Carls | 137—608 |

OTHER REFERENCES

"Modular Pneumatic Logic Package," R. F. Langley et al. I.B.M. Technical Disclosure Bulletin, vol. 6, No. 5, October 1963, pp. 3, 4.

"Fluid Control Device," S. W. Angrist, Scientific American, December 1964, pp. 79–88.

SAMUEL SCOTT, Primary Examiner

U.S. Cl. X.R.

137—608